United States Patent
Tomatis (12)

(10) Patent No.: US 6,672,203 B1
(45) Date of Patent: Jan. 6, 2004

(54) SHOVEL DEVICE FOR LOADING AND TRANSFERRING SHEET OF DOUGH PARTICULARLY FOR PIZZAS

(75) Inventor: Stefano Tomatis, Peveragno (IT)

(73) Assignee: CMT Costruzioni Meccaniche e Technologia S.p.A., Peveragno (IT)

( * ) Notice: Subject to any disclaimer, the term of this patent is extended or adjusted under 35 U.S.C. 154(b) by 0 days.

(21) Appl. No.: 10/276,876
(22) PCT Filed: May 8, 2001
(86) PCT No.: PCT/IB01/00780
§ 371 (c)(1), (2), (4) Date: Feb. 28, 2003
(87) PCT Pub. No.: WO01/87073
PCT Pub. Date: Nov. 22, 2001

(30) Foreign Application Priority Data

May 19, 2000 (IT) ........................................ TO2000A0458

(51) Int. Cl.[7] .............................. A23L 1/00; A23L 3/04; A21C 3/02; A21C 9/00; A21C 11/06
(52) U.S. Cl. .............................. 99/353; 99/349; 99/427; 99/443 R; 99/450.1; 99/450.6; 99/450.7
(58) Field of Search ........................... 99/349, 352–355, 99/450.1, 450.6, 450.7, 423, 427, 348, 372–380, 443 C, 443 R; 100/303; 118/18, 25, 411; 141/183; 222/370, 309, 288, 334, 360, 380, 486, 585; 211/150 A, 150 HC, 96; 425/162, 168, 360, 429; 426/27, 279, 280, 496, 523

(56) References Cited

U.S. PATENT DOCUMENTS

| 2,190,483 A | | 2/1940 | Pacilio |
| 3,460,191 A | | 8/1969 | Felstehausen |
| 4,116,119 A | | 9/1978 | Kuhlman |
| 5,012,726 A | * | 5/1991 | Fehr et al. ................... 99/450.6 |
| 5,117,749 A | * | 6/1992 | Bakker ....................... 99/450.1 |
| 5,121,677 A | * | 6/1992 | LeClaire et al. ............... 99/357 |
| 5,630,358 A | | 5/1997 | Patel |

FOREIGN PATENT DOCUMENTS

| GB | 12626 | 3/1915 |
| WO | WO 99/08537 | 2/1999 |
| WO | WO 00/42857 | 7/2000 |

* cited by examiner

Primary Examiner—Timothy F. Simone
(74) Attorney, Agent, or Firm—Browdy and Neimark, P.L.L.C.

(57) ABSTRACT

A substantially horizontal, flat shovel (30), made of thin, perforated metal plate, is integral with a slide (28) which is slidable on a guide (26), itself integral with a mounting (18). The shovel is driven by an actuator (20, 22, 24, 32, 34, 36) for moving forward and backward, while staying tangent to a facing rest shelf, at either of two speeds, a slow speed and a fast speed. The mounting (18) can move to different positions facing respective processing stations (42, 44).

6 Claims, 1 Drawing Sheet

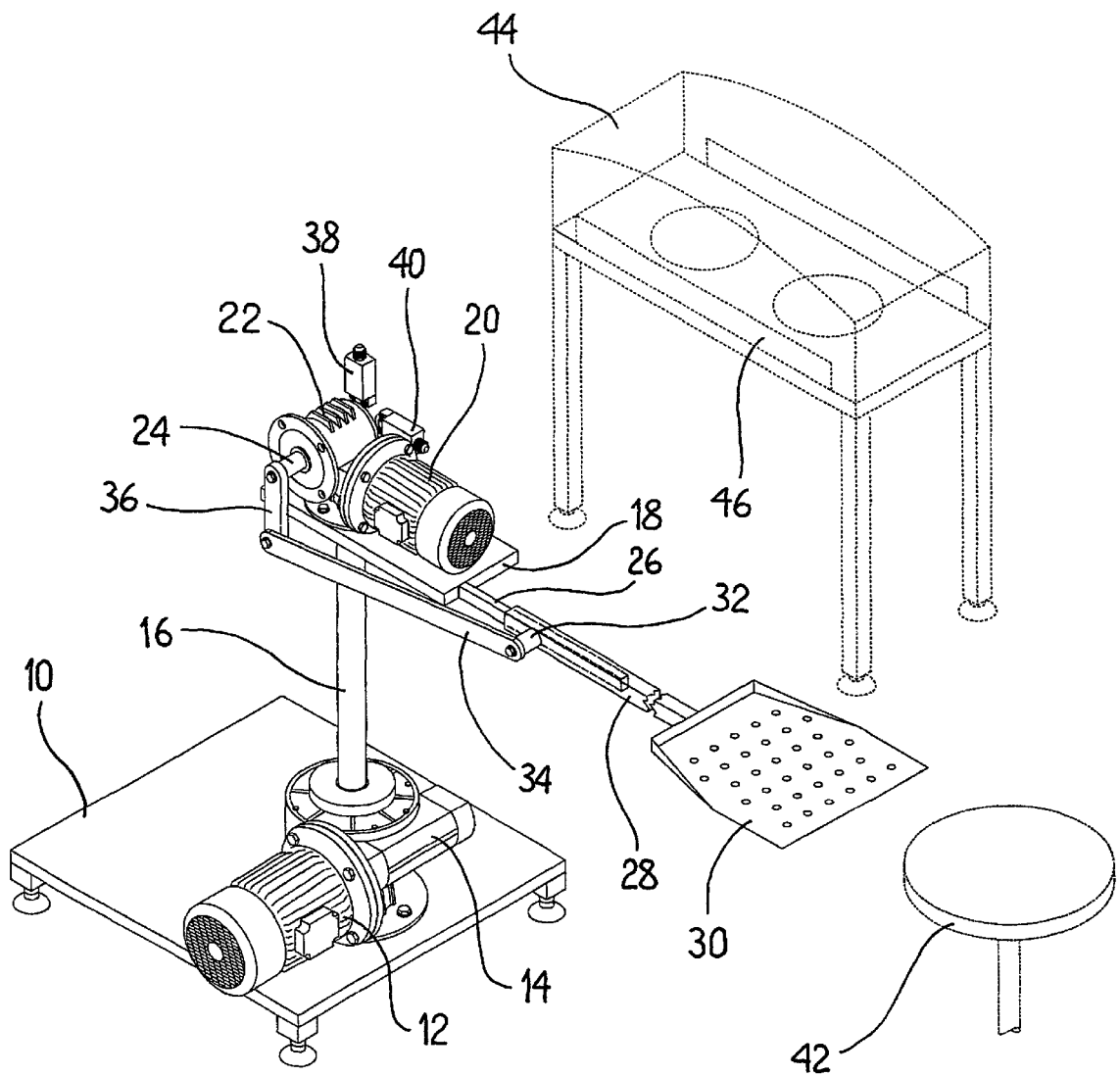

SHOVEL DEVICE FOR LOADING AND TRANSFERRING SHEET OF DOUGH PARTICULARLY FOR PIZZAS

This invention is concerned with a shovel device for loading and delivering disk-shape sheets of dough from one processing station to another, e.g. for transferring the sheets from a resting shelf to an oven. It is believed that the invention can be most effectively applied to mechanized pizza-making equipment, such as described, for instance, in WO-IB00/00023.

In known mechanized pizza-making equipment, the transfer of pizzas from one processing step to the next is generally performed by means of some kind of continuous conveyor belt, or by means of a set of trays shifting along a path. Whether with conveyor belts or with trays, however, each pizza rests permanently on the spot where it was originally placed, and it is its support which is shifted.

These known approaches, however, place restraints on the design of the entire system. For instance, a conveyor belt will bar the use of a conventional oven, and require a tunnel-type oven. Moreover, a conveyor belt does not allow a pizza to be flattened out from a lump of fresh dough, so that it is necessary to start processing from previously flattened pizzas. The same situation more or less prevails with other continuous transfer systems.

Another drawback of continuous transfer systems is that they generally are built to go through the oven, and therefore have to be built so that they can stand high temperatures. This is a further constraint in the choice of the operating mechanisms, and it increases, in general, the cost of the system.

It should also be noted that most known transfer mechanisms, particularly conveyor belts, are difficult to clean, and therefore have sanitary problems.

The main object of the invention is therefore to provide a shovel device for loading and tansferring pizzas from one processing station to another, by which a pizza can be loaded from a resting shelf and transferred to another resting support, without rumpling or mishandling the pizza, similarly to a shovel wielded by a pizza-cook.

Another object is to provide a device that is easy to subject to an overall cleaning.

The invention achieves the above and other objects and advantages, such as will appear from the following disclosure, with a shovel device for loading and transferring sheets of dough, particularly for pizzas, from one processing station to the next, and having the features recited in claim 1.

Other advantageous features of the invention are recited in the subordinate claims.

A preferred embodiment of the invention is described below in more detail, with reference to the attached drawing, wherein the single FIGURE is a perspective view of a shovel device according to a preferred embodiment of the invention, shown in relation to a pizza-carrying shelf and an oven, drawn in dotted lines.

For the sake of simplicity, the term "pizza" will be used below to mean also a disk-shape sheet of fresh dough, constituting a base for the preparation of a pizza ready for consumption.

With reference to the FIGURE, a device according to the preferred embodiment of the invention comprises a base 10, carrying an electric motor 12 with a reduction gear 14. Motor 12 has a vertical shaft 16 which carries, at its upper end, a bracket 18, on which is mounted a second electric motor 20 with respective reduction gear 22, for driving a horizontal shaft 24. Notor 20 can be driven at at least two different speeds.

Bracket 18 has a horizontal bar 26, over which a tubular slide 28 is slidably received, and which carries at its free end an integral shovel 30 of thin perforated metal plate. A boss 32, projecting from a side of slide 28, is connected to shaft 24 through a crank gear comprising a rod 34 and a crank 36, the latter being integral with shaft 24. Position detectors such as 38, 40 cooperate with reduction gear 22 to issue signals indicating the position of the mechanism to an electronic control not shown.

The FIGURE shows, in dotted lines and merely by way of illustration, a rest shelf 42 for a pizza waiting to be cooked (not shown) and a conventional oven 44, having a mouth 46.

It can be seen that, as shaft 24 performs a full turn, shovel 30 is also driven through a complete cycle of feeding and backing movement. In order to load a pizza resting on shelf 42, motor 20 is driven at a high speed for a fast forward movement of the shovel, which should be designed to move in precise tangency to the upper surface of shelf 42. This operation, of course, involves the usual sprinkling with flour to prevent sticking. The shovel will then pry between the shelf and the pizza, and the latter will stay substantially stationary, by inertia, as the shovel moves briskly forward. Consequently, at the end of the feeding movement, the pizza will be loaded on the shovel.

After this step, the motor rotation will continue at a low speed, and the shovel will therefore back away from support 42 at a slow speed, so that the pizza will be carried away together with the shovel.

The pizza having been loaded on the shovel, and the shovel having moved away from the support, motor 20 is stopped, while motor 12 is driven to move the shovel to another position, e.g. to a position in front of mouth 46 of oven 44. Motor 20 is then driven again to move shovel 30 forward at a slow speed, until the shovel has entered the oven mouth. At this point, the rotation of the motor continues at a high speed, so that the shovel is briskly withdrawn from the oven. The pizza, by its inertia, cannot follow the movement of the shovel and slides away from it, and becomes unloaded on the floor of oven 44.

It will be understood that the proper operation of the above-described device depends on prerequisites such as a precise positioning of the height of the shovel with respect to the shelf with which it cooperates, or the perforation of shovel 30 and a thorough sprinkling of flour on the pizza in order to prevent sticking.

Although the above example only considers two positions for loading or unloading the pizza, i.e. shelf 42 and oven 44, the above described device is best applied in a pizza-preparation system having a number of intermediate stops, e.g. at one or more distributors of dressing, such as a system as disclosed in WO-IB00/00023.

It will be understood that the forward and backward movement of the shovel could be obtained with a mechanism other than a crank gear, such as an air cylinder. In fact, practically any of the known alternative-motion devices can be used, provided that it can operate at two speeds. The sliding guide 26, 28 for the shovel support could also be replaced with another kind of guide, for instance, by exchanging the rod member with the tubular member, or by using other kinds of sliding guide, such as a trolley on a rail, etc.

It should also be understood that bracket 18, together with all the mechanisms carried by it, might be driven, rather than by a rotating shaft, by a traveling actuator which takes the shovel in succession in front of two or more operating positions along a linear direction.

I claim:

1. A shovel device for loading and transferring sheets of dough, particularly for pizzas, from one processing station to another, characterized in that it comprises a substantially horizontal, flat shovel (30), which is slidably supported with respect to a mounting (18), and driven by actuator means (20, 22, 24, 32, 34, 36) for moving forward and backward, while staying tangent to a facing rest shelf (42), at either of two speeds, a slow speed for transferring the sheet and a fast speed for loading or unloading the sheet, respectively; and first motor means (12, 14, 16) for changing the linear and/or angular position of said mounting.

2. The shovel device of claim 1, characterized in that the shovel (30) is integral with a slide (28) which is slidable on a guide (26) integral with said mounting (18).

3. The shovel device of claim 2, characterized in that said actuator means (20, 22, 24, 32, 34, 36) is operatively linked with said slide (28).

4. The shovel device of claim 3, characterized in that said actuator means comprises a shaft (24) driven in rotation by second, speed-adjustable motor means (20, 22) and a crank gear (34, 36) linking said shaft with a point (32) on said slide (28).

5. The shovel device of claim 4, characterized in that said crank gear comprises a crank (36) integral with the shaft (24) and a rod (34) linking the crank end with a point (32) on said slide (28).

6. The shovel device of claim 1, characterized in that said shovel (30) is made of a thin, densely perforated metal plate.

* * * * *